(12) United States Patent
Yun et al.

(10) Patent No.: US 11,776,755 B2
(45) Date of Patent: Oct. 3, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Hyung Duk Yun, Suwon-si (KR); Seonyoung Yoo, Suwon-si (KR); Hong Gi Kim, Suwon-si (KR); Byeongguk Choi, Suwon-si (KR); Young Hoon Song, Suwon-si (KR); Yuseop Lee, Suwon-si (KR); A Ra Cho, Suwon-si (KR); Donghwi Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 374 days.

(21) Appl. No.: 17/060,374

(22) Filed: Oct. 1, 2020

(65) Prior Publication Data
US 2021/0217561 A1 Jul. 15, 2021

(30) Foreign Application Priority Data
Jan. 14, 2020 (KR) .................. 10-2020-0004691

(51) Int. Cl.
*H01G 4/30* (2006.01)
*H01G 4/012* (2006.01)
(Continued)

(52) U.S. Cl.
CPC .............. *H01G 4/30* (2013.01); *H01G 4/008* (2013.01); *H01G 4/012* (2013.01); *H01G 4/1218* (2013.01); *H01G 4/2325* (2013.01)

(58) Field of Classification Search
CPC ........ H01G 4/005; H01G 4/008; H01G 4/012; H01G 4/2325; H01G 4/30
See application file for complete search history.

(56) References Cited

U.S. PATENT DOCUMENTS

| 2015/0090483 A1* | 4/2015 | Moon ................. H01G 4/232 29/25.42 |
| 2019/0013150 A1 | 1/2019 | Koo et al. |

(Continued)

FOREIGN PATENT DOCUMENTS

| KR | 10-2015-0037191 A | 4/2015 |
| KR | 10-2019-0004630 A | 1/2019 |

(Continued)

*Primary Examiner* — Nathan Milakovich
(74) *Attorney, Agent, or Firm* — MORGAN, LEWIS & BOCKIUS LLP (57) ABSTRACT

A multilayer ceramic electronic component includes a ceramic body having a dielectric layer, and a capacitance forming portion disposed in such a manner that first and second internal electrodes are stacked with the dielectric layer interposed therebetween, and first and second external electrodes disposed on the ceramic body, respectively, the first and second external electrodes including first and second base electrodes connected to the first and second internal electrodes, respectively, and first and second conductive layers disposed to cover the first and second base electrodes, respectively. The first and second conductive layers have a thickness in a range of 0.1 μm to 10 μm.

20 Claims, 5 Drawing Sheets

(51) Int. Cl.
*H01G 4/12* (2006.01)
*H01G 4/232* (2006.01)
*H01G 4/008* (2006.01)

(56) References Cited

U.S. PATENT DOCUMENTS

2020/0082984 A1* 3/2020 Kim .................... H01G 4/2325
2021/0090807 A1* 3/2021 Jeong .................. H01G 4/1227

FOREIGN PATENT DOCUMENTS

| KR | 20190116183 A | * | 10/2019 | ............... H01G 4/30 |
| KR | 20190121175 A | * | 10/2019 | ............. H01G 4/252 |
| WO | WO-2018181697 A1 | * | 10/2018 | ................ C08F 2/44 |

* cited by examiner

MULTILAYER CERAMIC ELECTRONIC COMPONENT

CROSS-REFERENCE TO RELATED APPLICATION(S)

This application claims benefit under 35 USC 119(a) of Korean Patent Application No. 10-2020-0004691 filed on Jan. 14, 2020 in the Korean Intellectual Property Office, the entire disclosure of which is incorporated herein by reference for all purposes.

TECHNICAL FIELD

The present disclosure relates to a multilayer ceramic electronic component.

BACKGROUND

Recently, with the trend for miniaturization of electronic products, multilayer ceramic electronic components have been also required to be miniaturized and to have high capacity. To meet the needs of miniaturization and high capacity of multilayer ceramic electronic components, external electrodes of multilayer ceramic electronic components have also been thinned.

On the other hand, the application fields of multilayer ceramic electronic components are expanding from traditional fields such as IC products to industrial electronics. To apply multilayer ceramic electronic components to various fields, it is necessary to exhibit a certain level or higher performance in various special environments.

Related art multilayer ceramic electronic components have used external electrodes having a multilayer structure to satisfy physical properties such as moisture resistance reliability and solder bonding properties. However, external electrodes having such a multilayer structure have different interfacial properties, and thus, when exposed to a harsh environment, there may be a problem such as separation between different external electrodes or peeling therebetween.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer ceramic electronic component in which a separation phenomenon between external electrodes may be prevented.

An aspect of the present disclosure is to provide a multilayer ceramic electronic component in which deterioration of electrical properties may be prevented even in a harsh environment.

According to an aspect of the present disclosure, a multilayer ceramic electronic component includes a ceramic body having fifth and sixth surfaces opposing each other in a first direction, third and fourth surfaces opposing each other in a second direction, and first and second surfaces opposing each other in a third direction, the ceramic body including a dielectric layer, and a capacitance forming portion disposed in such a manner that first and second internal electrodes are stacked in the third direction with the dielectric layer interposed therebetween, and first and second external electrodes disposed on the fifth and sixth surfaces of the ceramic body, respectively, the first and second external electrodes including first and second base electrodes connected to the first and second internal electrodes, respectively, and first and second conductive layers disposed to cover the first and second base electrodes, respectively. The first and second conductive layers have a thickness in a range of 0.1 µm to 10 µm.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the detailed shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative size, proportions, and depiction of elements in the drawings may be exaggerated for clarity, illustration, and convenience.

In this specification, expressions such as "at least one of A or B", "at least one of A or/and B", or "one or more of A or/and B" may include all possible combinations of the items listed together. For example, "A or B", "at least one of A and B", or "at least one of A or B" includes (1) at least one A, (2) at least one B, or (3) all cases including both at least one A and at least one B.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, the X direction may be defined as a first direction, an L direction or a longitudinal direction, a Y direction as a second direction, a W direction or a width direction, and a Z direction as a third direction, a T direction or a thickness direction.

Hereinafter, a multilayer ceramic electronic component according to an exemplary embodiment will be described in detail with reference to FIGS. 1 to 3.

Figure 1:
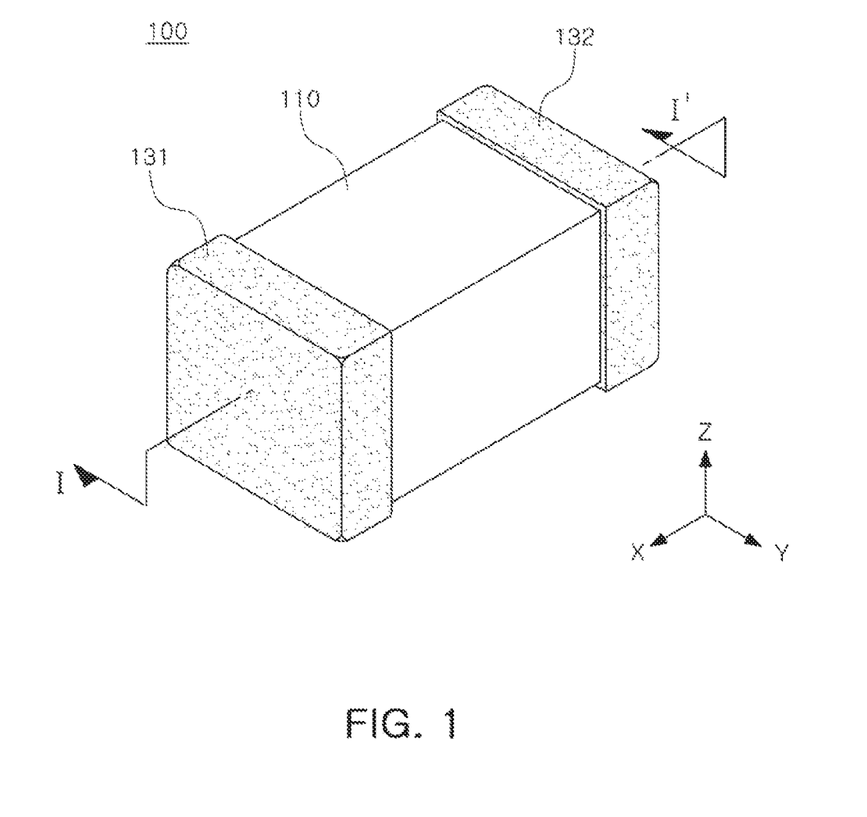
FIG. 1 is a perspective view schematically illustrating a multilayer ceramic electronic component according to an exemplary embodiment.
Figure 2:
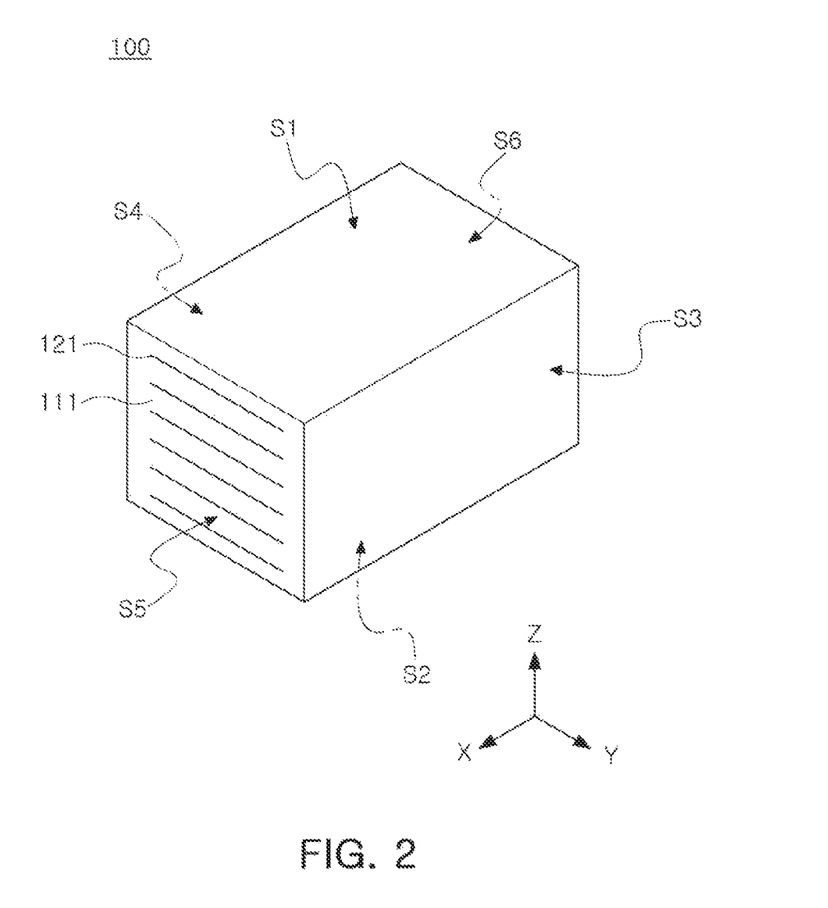
FIG. 2 is a perspective view schematically illustrating a ceramic body of a multilayer ceramic electronic component according to an exemplary embodiment.
Figure 3:
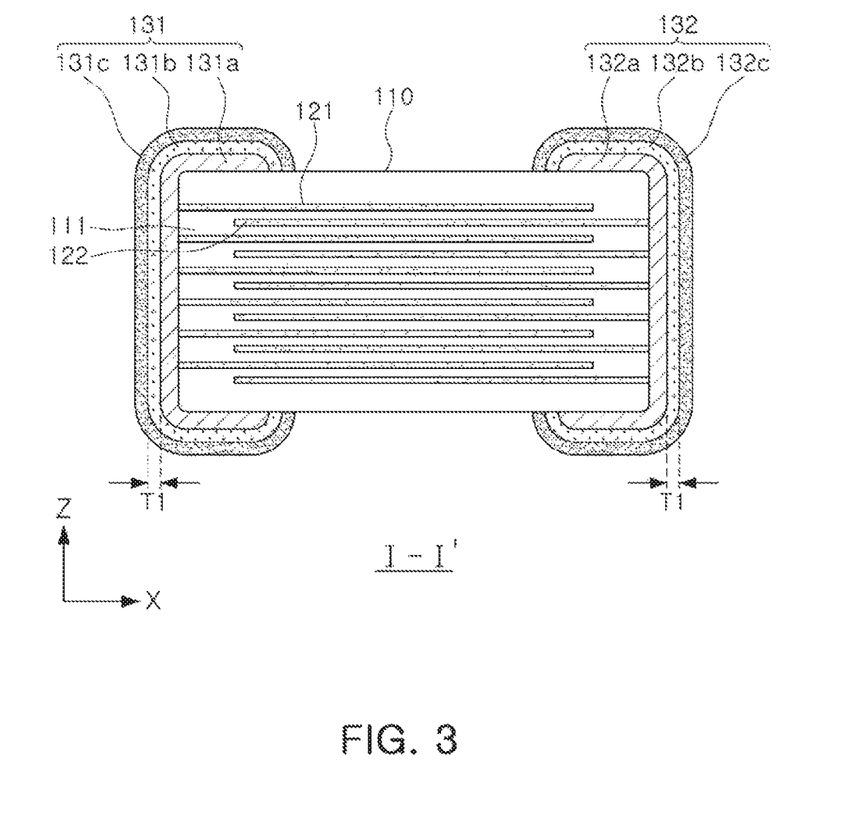
FIG. 3 is a cross-sectional view taken along line I-I' in FIG. 1.

Referring to FIGS. 1 to 3, a multilayer ceramic electronic component 100 according to an exemplary embodiment includes a ceramic body 110 having fifth and sixth surfaces S5 and S6 opposing each other in the first direction (the X direction), third and fourth surfaces S3 and S4 opposing each other in the second direction (the Y direction), and first and second surfaces S1 and S2 opposing each other in the third direction (the Z direction), and including a capacitance forming portion in which a dielectric layer 111 and first and second internal electrodes 121 and 122 are stacked with the dielectric layer 111 interposed therebetween in the third direction (the Z direction); and first and second external electrodes 131 and 132 including first and second base electrodes 131*a* and 132*a* disposed on the fifth surface S5 and the sixth surface S6 of the ceramic body 110 and connected to the first and second internal electrodes 121 and 122, respectively.

In this case, a thickness T1 of the first and second conductive layers 131*b* and 132*b* may be in a range of 0.1 μm to 10 μm. The thickness T1 of the first and second conductive layers 131*b* and 132*b* may refer to the length of the first and second conductive layers 131*b* and 132*b* in the first direction (the X direction). The thickness T1 may be an average of 10 values measured at arbitrary points of the first and second conductive layers 131*b* and 132*b* on the fifth and second surfaces S5 and S6 of the ceramic body 110. The thickness may be measured by using a scanning electron microscope scanning a center (middle) portion of the external electrode. When the first and second conductive layers 131*b* and 132*b* include a binder and a conductive material as described below, the first and second conductive layers 131*b* and 132*b* may function as a conductive adhesive layer, and may serve to improve the adhesion between heterogeneous materials. If the thickness T1 of the first and second conductive layers 131*b* and 132*b* is less than 0.1 μm, the bonding strength between the first and second base electrodes and the first and second terminal electrodes to be described below is weakened, so that the mechanical strength of the external electrode may be deteriorated, and when it exceeds 10 μm, the resistance of the external electrode may increase, resulting in a problem in which the electrical characteristics are deteriorated.

In an exemplary embodiment, the ceramic body 110 may include a capacitance forming portion in which the dielectric layer 111 and the first and second internal electrodes 121 and 122 are stacked with the dielectric layer 111 interposed therebetween in the third direction (the Z direction).

Although the ceramic body 110 is not limited to a particular shape, the ceramic body 110 may have a hexahedral shape or a shape similar thereto as illustrated in the drawings. Due to the shrinkage of the ceramic powder contained in the ceramic body 110 during the firing process, the ceramic body 110 may have a substantially hexahedral shape, although it has a hexahedral shape without completely straight lines. The ceramic body 110 may have the fifth and sixth surfaces S5 and S6 opposing each other in the longitudinal direction (the X direction), the third and fourth surfaces S3 and S4 connected to the fifth and sixth surfaces S5 and S6 and opposing each other in the width direction (the Y direction), and the first and second surfaces S1 and S2 connected to the fifth and sixth surfaces S5 and S6, connected to the third and fourth surfaces S3 and S4 and opposing each other in the thickness direction (the Z direction).

The ceramic body 110 may be formed by alternately stacking, a ceramic green sheet on which the first internal electrode 121 is printed on the dielectric layer 111 and a ceramic green sheet on which the second internal electrode 122 is printed on the dielectric layer 111, in the thickness direction (the Z direction).

The capacitance forming portion may be formed by alternately stacking the dielectric layers 111 and the internal electrodes 121 and 122 in the third direction (the Z direction). The plurality of dielectric layers 111 forming the capacitance forming portion are in a fired state, and adjacent dielectric layers 111 may be integrated to a degree to which the boundary may not be confirmed without using a scanning electron microscope (SEM).

According to an exemplary embodiment, a raw material for the formation of the dielectric layer 111 is not particularly limited as long as a sufficient electrostatic capacity may be obtained therewith. For example, a barium titanate-based material, a lead composite perovskite-based material, or a strontium titanate-based material may be used.

Further, as the material for the formation of the dielectric layer 111, various ceramic additives, organic solvents, plasticizers, binders, dispersants, etc. may be added to the powder particles such as barium titanate ($BaTiO_3$), depending on the usage in exemplary embodiments.

For example, the dielectric layer 111 may be formed by applying and drying a slurry formed to include a powder such as barium titanate ($BaTiO_3$) on a carrier film to prepare a plurality of ceramic sheets. The ceramic sheets may be formed by mixing a ceramic powder, a binder, and a solvent to prepare a slurry, and forming the slurry as a sheet having a thickness of several μm by a doctor blade method, but the forming method is not limited thereto.

In the multilayer ceramic electronic component according to an exemplary embodiment, the plurality of internal electrodes 121 and 122 may be disposed to face each other with the dielectric layer 111 interposed therebetween. The internal electrodes (121 and 122) may include first and second internal electrodes 121 and 122 alternately disposed to face each other with the dielectric layer 111 interposed therebetween.

The first internal electrode 121 may be exposed to one surface S5 of the ceramic body 110 in the first direction (the X direction), and an exposed portion of the first internal electrode 121 exposed to one surface S5 in the first direction (the X direction) may be connected to the first base electrode 131a. The second internal electrode 122 may be exposed to the other surface S6 of the ceramic body 110 in the first direction (the X direction), and an exposed portion of the second internal electrode 122 exposed to the other surface S6 in the first direction (the X direction) may be connected to the second base electrode 132a. The first and second internal electrodes 121 and 122 may be electrically separated from each other by the dielectric layer 111 disposed therebetween.

The materials forming the first and second internal electrodes 121 and 122 are not particularly limited, and the first and second internal electrodes 121 and 122 may be formed using a conductive paste containing one or more materials of silver (Ag), palladium (Pd), gold (Au), platinum (Pt), nickel (Ni), copper (Cu), tin (Sn), tungsten (W), titanium (Ti), and alloys thereof. The conductive paste may be printed using a screen-printing method or a gravure printing method, but the present disclosure is not limited thereto.

In the multilayer ceramic electronic component according to an exemplary embodiment, margin portions may be disposed on both surfaces of the capacity forming portion in the second direction (the Y direction). The margin portions may be disposed on both surfaces of the capacitance forming portion in the second direction (the Y direction) perpendicular to the first and third directions (the X direction and Z direction), respectively. The margin portion may serve to prevent damage to the internal electrodes due to physical or chemical stress.

The margin portions may be formed of an insulating material, and may be formed of a ceramic material such as barium titanate. In this case, the margin portions may include the same ceramic material as that included in the dielectric layer 111, or may be formed of the same material as that of the dielectric layer 111. A method of forming the margin portion is not particularly limited. For example, by forming the area of the dielectric layer included in the capacitance forming portion larger than the area of the internal electrode, the margin portions may be formed by forming a margin region on the remaining circumference of the internal electrode except for a portion of the internal electrode connected to the external electrode or by applying a slurry containing ceramic, or by attaching a dielectric sheet to both surfaces of the capacitance forming portion in the second portion (the Y direction).

The multilayer ceramic electronic component according to an exemplary embodiment may include a cover portion. The cover portion may be disposed on outermost portions of the first and second internal electrodes 121 and 122. The cover portion may be disposed on a lower portion of a lowermost internal electrode of the body 110 and on an upper portion of an uppermost internal electrode of the body 110. In this case, the cover portion may be formed of the same composition as the dielectric layer 111, and may be formed by stacking at least one or more of the dielectric layers that do not include the internal electrode on the uppermost internal electrode and below the lowermost internal electrode of the body 110, respectively. The cover portion may basically serve to prevent damage to the internal electrodes due to physical or chemical stress.

In an exemplary embodiment, the first and second base electrodes 131a and 132a connected to the first and second internal electrodes 121 and 122 of the multilayer ceramic electronic component 100 according to an exemplary embodiment may be fired electrodes including a first conductive metal. As the first conductive metal included in the first base electrode 131a and the second base electrode 132a, various metals having excellent contact with the internal electrode may be used, and for example, one or more conductive metals such as copper (Cu), nickel (Ni), tin (Sn), palladium (Pd), platinum (Pt), iron (Fe), gold (Au), silver (Ag), tungsten (W), titanium (Ti), lead (Pb), and alloys thereof may be used. For example, when the first and second base electrodes 131a and 132a are formed of a fired electrode containing a first conductive metal as in this embodiment, the connection with the internal electrode may be increased, and the mechanical strength of the multilayer ceramic electronic component may be improved.

In an example, the first base electrode 131a and the second base electrode 132a may further include a glass component. The glass component may be a composition in which oxides are mixed, and is not particularly limited, but may be one or more selected from the group consisting of silicon oxide, boron oxide, aluminum oxide, transition metal oxide, alkali metal oxide, and alkaline earth metal oxide. The transition metal may be selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na) and potassium (K), and the alkaline earth metal may be one or more selected from the group consisting of magnesium (Mg), calcium (Ca), strontium (Sr) and barium (Ba). In one example, the first and second base electrodes 131a and 132a may be sintered electrodes including the first conductive metal.

A method of forming the first base electrode 131a and the second base electrode 132a is not particularly limited. For example, in various methods to form the first base electrode 131a and the second base electrode 132a, a conductive paste containing a first conductive metal may be printed or applied to the surface of the ceramic body 110 by a screen-printing method or a gravure printing method, the ceramic body 110 may be dipped in conductive paste, or a dry film obtained by drying the conductive paste may be transferred onto the ceramic body 110, but the method is not limited thereto.

In an exemplary embodiment, the first and second conductive layers 131b and 132b disposed to cover the first and second base electrodes 131a and 132a may include a conductive material and a binder. When the first and second conductive layers 131b and 132b include a conductive material and a binder, the first and second conductive layers 131b and 132b may substantially function as conductive adhesive layers. The binder is not particularly limited as long as it satisfies required adhesive strength, but may be, for example, one or more types selected from polystyrene-type, vinyl acetate-type, polyester-type, polyethylene-type, polypropylene-type, polyamide-type, rubber-type, and/or acrylic-type thermoplastic resins; and phenol-based, epoxy-based, urethane-based, melamine-based, and/or alkyd-based thermosetting resins.

Detailed examples of the thermoplastic resin may be styrene resins, (meth) acrylic resins, organic acid vinyl ester resins, vinyl ether resins, halogen-containing resins, olefin resins (including alicyclic olefin resins), polycarbonate resins, polyester resins, polyamide resins, thermoplastic polyurethane resins, polysulfone resins (for example, polyethersulfone, polysulfone), polyphenylene ether resins (for example, 2,6-xyllenol polymer), cellulose derivatives (e.g., cellulose esters, cellulose carbamates, cellulose ethers), silicone resins (e.g., polydimethylsiloxane, polymethylphenylsiloxane), rubbers or elastomers (e.g., diene rubbers such as polybutadiene, polyisoprene, etc., styrene-butadiene copolymer, acrylonitrile-butadiene copolymer, acrylic rubber, urethane rubber, and silicone rubber) and the like, which may be used alone or in combination of two or more thereof, but the examples are not limited thereto.

Among them, the polyester resins may include any suitable polyol. Suitable examples of polyols include, but are not limited to, 2,2,4,4-tetraalkylcyclobutane-1,3-diol (IACD); alkylene glycols such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols such as 1,2-propanediol, 1,3-propanediol, butyl ethyl propanediol, 2-methyl-1,3-propanediol and 2-ethyl-2-butyl-1,3-propanediol; butanediols such as 1,4-butanediol, 1,3-butanediol and 2-ethyl-1,4-butanediol; pentanediol such as trimethyl pentanediol and 2-methylpentanediol; cyclohexane dimethanol; hexanediol such as 1,6-hexanediol; caprolactone diols (e.g., reaction products of ε-caprolactone and ethylene glycol); hydroxyalkylated bisphenols; polyether glycols such as poly(oxytetramethylene) glycol; trimethylol propane; pentaerythritol; di-pentaerythritol; trimethylol ethane; trimethylol butane; dimethylol cyclohexane; bio-derived polyols such as glycerol, sorbitol and isosorbide; or analogues or combinations thereof, but the embodiment is not limited thereto.

Further, detailed examples of the thermosetting resin may include phenol resin, urea resin, diallyl phthalate resin, melanin resin, guanamine resin, unsaturated polyester resin, polyurethane resin, epoxy resin, amino alkyd resin, melamine-urea co-condensation resin, silicon resin, polysiloxane resin, and the like, but the example is not limited thereto. In the case of using a thermosetting resin, a crosslinking agent, a curing agent such as a polymerization initiator, a polymerization accelerator, a solvent, a viscosity modifier, etc. may be further used as required.

In an example, the first and second conductive layers 131b and 132b may include a binder within a range of 7 to 30% by weight. In this specification, "binder" may refer to an adhesive material capable of adhering two interfaces having the same or different surface properties to each other in a curing process, and may refer to a material capable of having binding force with respect to the surface molecules of the adhesive and the adherend by chemical/mechanical interactions. Based on the total weight of the first and second conductive layers 131b and 132b, the content of the binder may be 7 wt % or more, 8 wt % or more, 9 wt % or more, or 10 wt % or more, and may be 30 wt % or less, 29 wt % or less, 28 wt % or less, 27 wt % or less, 26 wt % or less, or 25 wt % or less. In the multilayer ceramic electronic component according to this embodiment, as the first and second conductive layers 131b and 132b disposed on the first and second base electrodes 131a and 132a include the binder in the above range, the first and second conductive layers 131b and 132b may have the aforementioned thickness, and even when the multilayer ceramic electronic component is exposed to a relatively high temperature environment, defects such as lifting of the external electrodes may be prevented.

In another embodiment, the first and second conductive layers 131b and 132b disposed to cover the first and second base electrodes 131a and 132a may include a conductive material in a range of 93% by weight or less. The conductive material may be included in the range of, for example, 93% by weight or less, 92% by weight or less, 91% by weight or less, or 90% by weight or less, and in the range of 70% or more, 71% or more, 72% or more, and 73% or more % Or more, 74% by weight or more, or 75% by weight or more, but the embodiment is not limited thereto. Defects such as lifting of the first and second conductive layers 131b and 132b may be prevented while excellent electrical properties are exhibited, as the conductive material is included in the first and second conductive layers 131b and 132b satisfies the above range in the multilayer ceramic electronic component according to an exemplary embodiment.

In an example, the conductive material included in the first and second conductive layers 131b and 132b of the multilayer ceramic electronic component according to an exemplary embodiment may include a second conductive metal and/or a conductive polymer. As an example without limitation, examples of the second conductive metal may include lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), nickel (Ni), palladium (Pd), platinum (Pt), copper (Cu), silver (Ag), gold (Au), zinc (Zn), cadmium (Cd), mercury (Hg), aluminum (Al), gallium (Ga), indium (In), thallium (Tl), tin (Sn), lead (Pb), bismuth (Bi) and/or polonium (Po), but the examples are not limited thereto.

Non-limiting examples of the conductive polymer may include sulfur (S) and/or nitrogen (N)-containing compounds, such as poly(thiophene) (PT), poly(ethylenedioxy)thiophene (PEDOT), poly(p-phenylene sulfide) (PPS), polyanilines (PANI), poly(3-hexylthiophene-2,5-diyl) (P3HT), poly(4-butylphenyldiphenylamine) (PolyTPD), poly(4-butylphenyldiphenylamine) (PSS), poly(9-vinylcarbazole) (PVK), poly(4,4'-dimethoxy bithophene) (PDBT), polyaniline, polypyrrole, or the like, and may include heteroatom-free compounds, such as poly(fluorine), polyphenylene, polypyrene, polyazulene, polynaphthalene, poly(acetylene) (PAC), poly(p-phenylene vinylene) (PPV), or the like, but the examples are not limited thereto.

The conductive material is a material for imparting electrical conductivity to the first and second conductive layers 131b and 132b, and may further include a separate conductive filler or the like in a range satisfying the aforementioned content range. Examples of the conductive filler may include carbon fillers such as carbon nanotubes, graphene, fullerenes or the like, and/or spherical, oval, flake, fiber or resin (dendrite) alloy fillers, but the examples are not limited thereto.

In an example, the first and second conductive layers 131b and 132b of the multilayer ceramic electronic component according to an exemplary embodiment may be configured in such a manner that a 10% weight loss temperature measured by a thermo-gravimetric analysis (TGA) device is 160° C. or higher. The multilayer ceramic electronic component according to an exemplary embodiment may further include a terminal electrode mounted on a substrate as described later. In this case, in the process of forming the terminal electrode, thermal stability is required in which the first and second conductive layers 131b and 132b are not thermally decomposed. The first and second conductive layers of the multilayer ceramic electronic component according to an exemplary embodiment may maintain excellent bonding strength between the base electrode and the terminal electrode by suppressing thermal decomposition at 160° C. or higher. In an exemplary embodiment, the thermal stability was evaluated using a thermogravimetric analysis (TGA) device. In the process of heating from 30° C. to 350° C. at a rate of 5° C./min under a nitrogen atmosphere, the temperature at which the weights of the first and second conductive layers were reduced by 10% was measured to evaluate the temperature as thermal stability. The 10% weight loss temperature may be 160° C. or higher, 165° C. or higher, 170° C. or higher, or 175° C. or higher, and the upper limit thereof is not particularly limited, but may be 500° C. or lower.

In another example, the first and second conductive layers 131b and 132b of the multilayer ceramic electronic component according to an exemplary embodiment may be configured in such a manner that a difference ($\Delta T$) between a thermal decomposition initiation temperature and a thermal decomposition termination temperature, measured by the thermo-gravimetric analysis (TGA) device, may be 15° C. or higher. The thermal decomposition initiation temperature of the first and second conductive layers 131b and 132b may be, for example, 160° C. or higher, 163° C. or higher, or 165° C. or higher, and the thermal decomposition termination temperature may be 190° C. or lower, 187° C. or lower, or 185° C. or lower, but are not limited thereto. The thermal decomposition initiation temperature and the thermal decomposition termination temperature may be values measured in the process of heating from 30° C. to 350° C. at a rate of 5° C./min under a nitrogen atmosphere using the above-described thermogravimetric analysis (TGA) device. The difference ($\Delta T$) between the thermal decomposition initiation temperature and the thermal decomposition termination temperature of the first and second conductive layers 131b and 132b according to an exemplary embodiment satisfies the above range, whereby defects such as lifting of external electrodes may be effectively suppressed.

In an exemplary embodiment, a first terminal electrode 131c and a second terminal electrode 132c may be disposed on the first conductive layer 131b and the second conductive layer 132b of the multilayer ceramic electronic component 100, respectively. The first terminal electrode 131c and the second terminal electrode 132c may be disposed to cover the first conductive layer 131b and the second conductive layer 132b, respectively. In this specification, the terminal electrodes 131c and 132c are disposed to cover the conductive layers 131b and 132b, which may mean that the terminal electrodes 131c and 132c are disposed so that the conductive layers 131b and 132b are not exposed externally. In detail, the first conductive electrode 131b and the second conductive layer 132b are disposed inside the first external electrode 131 and the second external electrode 132, respectively, so that only the first terminal electrode 131c and the second terminal electrode 132c may be visible from externally.

In an exemplary embodiment, the first and second terminal electrodes 131c and 132c disposed on the first and second conductive layers 131b and 132b may be conductive resin layers. The conductive resin layers may include a third conductive metal and a base resin. The conductive resin layers may be formed of a conductive paste for external electrodes including metal particles and a base resin.

The conductive resin layer includes a third conductive metal, and the third conductive metal may be in the form of powder. The shape of the third conductive metal powder may be spherical or flake-shaped. In the conductive resin layer, the third conductive metal particles may be disposed in contact with or adjacent to each other, and the base resin may be disposed to surround the metal particles.

The third conductive metal is not particularly limited as long as it is a particle of a metal having excellent conductivity, and may include, for example, copper (Cu), silver (Ag), nickel (Ni), and alloys thereof.

The base resin may be a thermosetting resin. The thermosetting resin may be an epoxy resin, but is not limited thereto.

The first and second terminal electrodes 131c and 132c disposed on the first and second conductive layers 131b and 132b are formed of a conductive resin layer to protect the multilayer ceramic electronic component from external thermal, chemical, and physical stress, to prevent moisture from penetrating into the ceramic body, and to prevent a plating solution from penetrating into the ceramic body when forming the plating layer. Therefore, the moisture resistance reliability of the multilayer ceramic electronic component according to an exemplary embodiment may be improved.

Experimental Example

The first and second conductive layers were formed by preparing a sintered chip in which the first and second base electrodes including nickel (Ni) were formed, and by preparing a binder and a second conductive metal having the composition illustrated in Table 1 below and then coating the chip.

Figure 4:
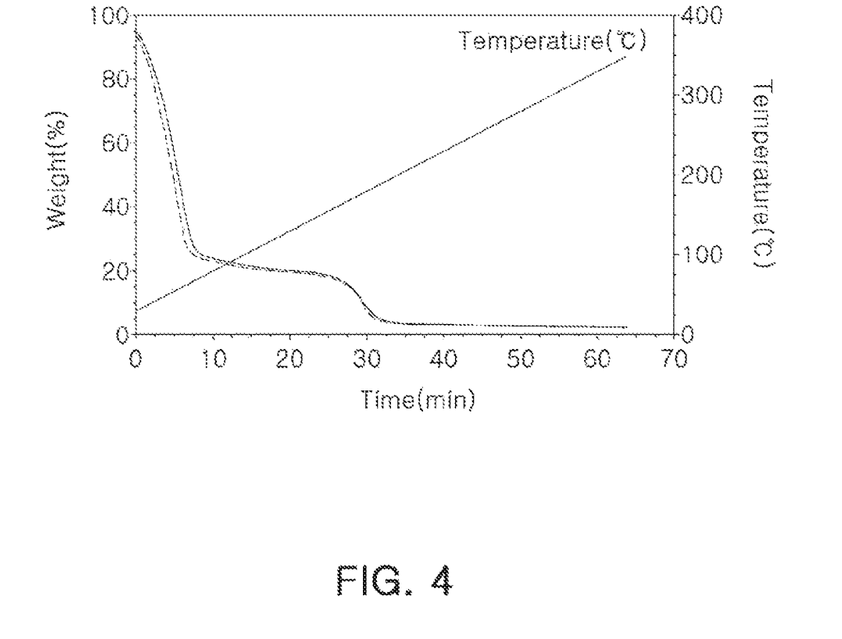
FIG. 4 illustrates TGA analysis data of first and second conductive layers according to an exemplary embodiment.
Figure 5:
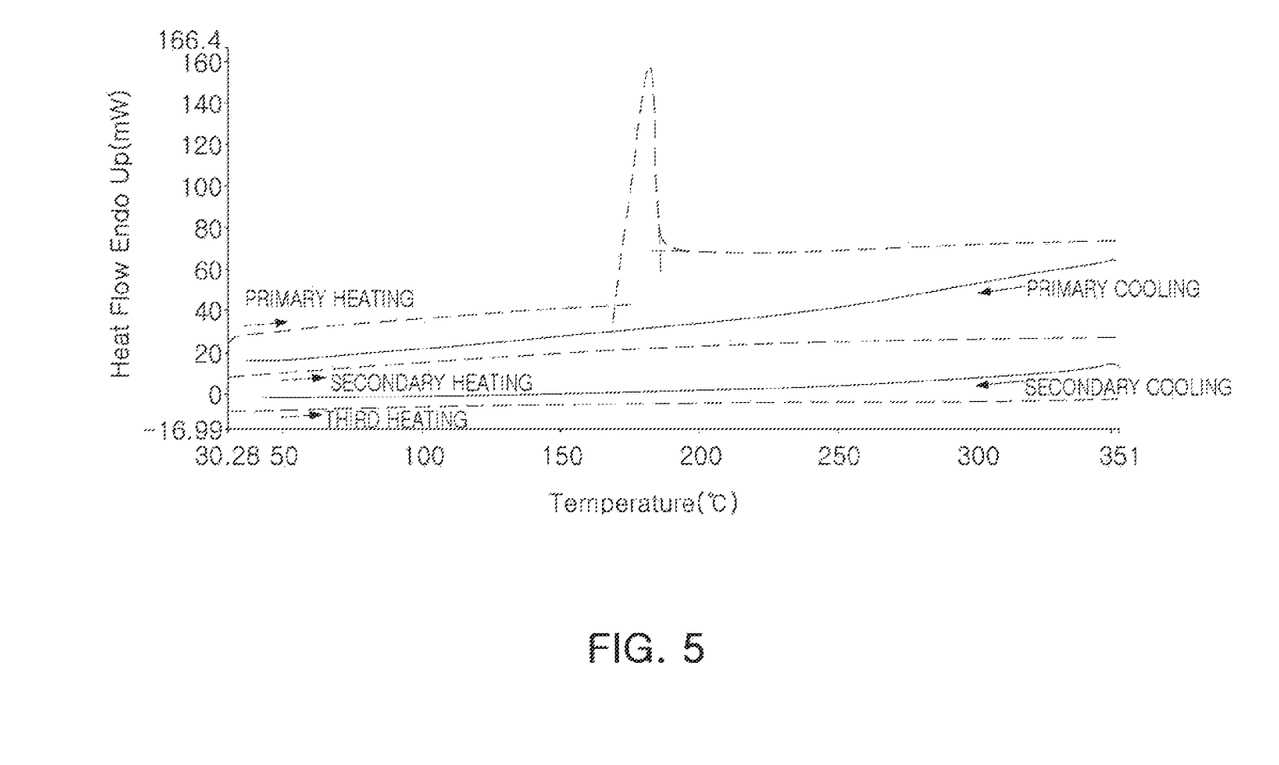
FIG. 5 illustrates DSC analysis data of first and second conductive layers according to an exemplary embodiment.

FIGS. 4 and 5 illustrate TGA and DSC analysis results for the first and second conductive layers. Referring to FIGS. 4 and 5, it can be seen that the weight loss at 100° C. or lower is analyzed as solvent volatilization, and the loss by thermal decomposition before and after 180° C. is within 10% by weight. Therefore, it was confirmed that there was no abnormality in thermal stability.

In addition, after the formation of the first and second conductive layers, evaluation of ESR and defects such as lifting was conducted by using chips in which first and second terminal electrodes including copper (Cu) were formed to cover the first and second conductive layers.

In Table 1 and Table 2, defects such lifting was evaluated by using the in-house measuring equipment universal material tester (Tira) capacity method, and the ESR was measured after evaluating the flexural strength of a 3225-sized chip.

TABLE 1

| Sample | Thickness (um) of first and second conductive layers | ESR | Defect such as lifting (275° C., reflow 3 times) |
|---|---|---|---|
| 1 | 0.01 | 31 mΩ | NG |
| 2 | 0.03 | 29 mΩ | NG |
| 3 | 0.05 | 26 mΩ | NG |
| 4 | 0.1 | 20 mΩ | OK |
| 5 | 0.3 | 14 mΩ | OK |
| 6 | 0.5 | 12 mΩ | OK |
| 7 | 1.0 | 11 mΩ | OK |
| 8 | 3.0 | 8 mΩ | OK |
| 9 | 5.0 | 9 mΩ | OK |
| 10 | 10.0 | 7 mΩ | OK |

Referring to Table 1, when the thicknesses of the first and second conductive layers are 50 nm or less, the ESR value is not significantly improved, and it can be confirmed that defects such as lifting occur, and when the thicknesses of the first and second conductive layers are 100 nm or more, it can be seen that excellent ESR values may be obtained and defects such as lifting may be prevented. Therefore, it can be seen that when the first and second conductive layers disposed between the base electrode and the terminal electrode are layers having a thickness of 100 nm or more, the lifting inside the external electrode may be prevented.

When the thickness of first and second conductive layer exceed 1 μm, the defect such as delamincation is still well prevented; however, the electrical property degrade due to thermal degradation of polymer. Thus, thickness under 1 μm of first and second conductive layer is recommended.

TABLE 2

| Sample | Binder (wt %) | Conductive Material (wt %) | ESR | Defect such as lifting (275° C., Reflow 3 times) |
|---|---|---|---|---|
| 1 | D-sorbitol (1 wt %) | PEDOT (99 wt %) | 7 mΩ | NG |
| 2 | D-sorbitol (2 wt %) | PEDOT (98 wt %) | 8 mΩ | NG |
| 3 | D-sorbitol (3 wt %) | PEDOT (99 wt %) | 7 mΩ | NG |
| 4 | D-sorbitol (5 wt %) | PEDOT (95 wt %) | 9 mΩ | NG |
| 5 | D-sorbitol (10 wt %) | PEDOT (90 wt %) | 9 mΩ | OK |
| 6 | D-sorbitol (15 wt %) | PEDOT (85 wt %) | 13 mΩ | OK |
| 7 | D-sorbitol (30 wt %) | PEDOT (70 wt %) | 17 mΩ | OK |
| 8 | D-sorbitol (50 wt %) | PEDOT (50 wt %) | 100 mΩ | NG |

Referring to Table 2, it can be seen that when the content of the binder is 5% by weight, a defect such as lifting occurs, but when the binder content is 10% by weight, an excellent ESR value is exhibited without causing a defect such as lifting. Therefore, it may mean that the lifting of the inside of the external electrode may be prevented by an intermediate value of 5% by weight and 10% by weight included in the binder.

In addition, in Table 2, when the binder is 30% by weight, a defect such as lifting does not occur, but it can be confirmed that the ESR appears relatively high. Therefore, it can be seen that the contents of the conductive material and the binder should be adjusted to an appropriate range.

In addition, in Table 2, when the binder is over 30% by weight, for example 50%, a defect such as lifting does not occur; however, it can be confirmed that the ESR appears relatively high. Such insulating material (D-sorbitol) can hinder the electrical pathway and deleterious effect on the electrical property As set forth above, according to an exemplary embodiment, a multilayer ceramic electronic component capable of preventing a separation phenomenon between external electrodes having a multilayer structure may be provided.

According to an exemplary embodiment, a multilayer ceramic electronic component capable of maintaining electrical properties even in a harsh environment may be provided.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer ceramic electronic component comprising:
a ceramic body having fifth and sixth surfaces opposing each other in a first direction, third and fourth surfaces opposing each other in a second direction, and first and second surfaces opposing each other in a third direction, the ceramic body including a capacitance forming portion in which a dielectric layer and first and second internal electrodes are stacked in the third direction with the dielectric layer interposed therebetween; and
first and second external electrodes disposed on the fifth and sixth surfaces of the ceramic body, respectively, the first and second external electrodes including first and second base electrodes connected to the first and second internal electrodes, respectively, and first and second conductive layers disposed to cover the first and second base electrodes, respectively,
wherein the first and second conductive layers have a thickness in a range of 0.1 μm to 10 μm and comprise a conductive polymer as a conductive material.

2. The multilayer ceramic electronic component of claim 1, wherein the first and second base electrodes each include a sintered electrode including a first conductive metal.

3. The multilayer ceramic electronic component of claim 2, wherein the first conductive metal includes one or more of copper (Cu), nickel (Ni), tin (Sn), palladium (Pd), platinum (Pt), iron (Fe), gold (Au), silver (Ag), tungsten (W), titanium (Ti), lead (Pb), or alloys thereof.

4. The multilayer ceramic electronic component of claim 1, wherein the first and second base electrodes each include a first conductive metal and a glass component.

5. The multilayer ceramic electronic component of claim 1, wherein the first and second conductive layers further comprise a binder,
wherein the binder is one or more selected from polystyrene-based, vinyl acetate-based, polyester-based, polyethylene-based, polypropylene-based, polyamide-based, rubber-based and/or acrylic-based thermoplastic resins; and phenol-based, epoxy-based, urethane-based, melamine-based and/or alkyd-based thermosetting resins.

6. The multilayer ceramic electronic component of claim 5, wherein the first and second conductive layers comprise the binder in a range of 7% by weight to 30% by weight with respect to a total weight of the first and second conductive layers.

7. The multilayer ceramic electronic component of claim 6, wherein the first and second conductive layers have a thickness in a range of 0.1 μm to 1 μm.

8. The multilayer ceramic electronic component of claim 5, wherein the conductive material is included in an amount of 93% by weight or less relative to a total weight of the first and second conductive layers.

9. The multilayer ceramic electronic component of claim 5, wherein the conductive material further comprises a second conductive metal.

10. The multilayer ceramic electronic component of claim 9, wherein the second conductive metal includes one or more of lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), nickel (Ni), palladium (Pd), platinum (Pt), copper (Cu), silver (Ag), gold (Au), zinc (Zn), cadmium (Cd), mercury (Hg), aluminum (Al), gallium (Ga), indium (In), thallium (Tl), tin (Sn), lead (Pb), bismuth (Bi), or polonium (Po).

11. The multilayer ceramic electronic component of claim 1, wherein the first and second conductive layers have a 10% weight loss temperature of 160° C. or higher.

12. The multilayer ceramic electronic component of claim 11, wherein the 10% weight loss temperature of 160° C. or higher is measured by a thermogravimetric analysis (TGA) device.

13. The multilayer ceramic electronic component of claim 1, further comprising:
a margin portion disposed on both surfaces of the capacitance forming portion in the second direction; and
a cover portion disposed on both surfaces of the capacitance forming portion in the third direction.

14. The multilayer ceramic electronic component of claim 1, further comprising first and second terminal electrodes disposed on the first and second conductive layers, respectively.

15. The multilayer ceramic electronic component of claim 14, wherein the first and second terminal electrodes each include a conductive resin layer including a third conductive metal and a base resin.

16. The multilayer ceramic electronic component of claim 15, wherein the third conductive metal includes copper (Cu), silver (Ag), nickel (Ni), or alloys thereof.

17. The multilayer ceramic electronic component of claim 1, wherein the first and second conductive layers have a thickness in a range of 0.1 μm to 1 μm.

18. The multilayer ceramic electronic component of claim 1, wherein the conductive polymer includes a sulfur (S) and/or nitrogen (N)-containing compound or a heteroatom-free compound.

19. The multilayer ceramic electronic component of claim 1, wherein the conductive polymer includes one of poly(thiophene) (PT), poly(ethylenedioxy)thiophene (PEDOT), poly(p-phenylene sulfide) (PPS), polyanilines (PANT), poly(3-hexylthiophene-2,5-diyl) (P3HT), poly(4-butylphenyldiphenylamine) (PolyTPD), poly(4-butylphenyldiphenylamine) (PSS), poly(9-vinylcarbazole) (PVK), poly(4,4'-dimethoxy bithophene) (PDBT), polyaniline, polypyrrole, poly(fluorine), polyphenylene, polypyrene, polyazulene, polynaphthalene, poly(acetylene) (PAC), and poly(p-phenylene vinylene) (PPV).

20. A multilayer ceramic electronic component comprising:
a ceramic body having fifth and sixth surfaces opposing each other in a first direction, third and fourth surfaces opposing each other in a second direction, and first and second surfaces opposing each other in a third direction, the ceramic body including a capacitance forming portion in which a dielectric layer and first and second internal electrodes are stacked in the third direction with the dielectric layer interposed therebetween; and
first and second external electrodes disposed on the fifth and sixth surfaces of the ceramic body, respectively, the first and second external electrodes including first and second base electrodes connected to the first and second internal electrodes, respectively, and first and second conductive layers disposed to cover the first and second base electrodes, respectively, wherein the first and second conductive layers comprise a conductive material and D-sorbitol.

* * * * *